United States Patent [19]

Wright

[11] Patent Number: 4,535,014
[45] Date of Patent: Aug. 13, 1985

[54] METHOD OF MOLDING A MULTI-COLORED ARTICLE

[75] Inventor: Douglas Wright, Windsor, Calif.

[73] Assignee: Frederick Bugay, San Francisco, Calif.

[21] Appl. No.: 307,439

[22] Filed: Oct. 1, 1981

[51] Int. Cl.³ .............................. B44T 1/10; B32B 3/10
[52] U.S. Cl. ..................................... 428/30; 264/246;
  264/328.8; 428/195; 15/167 R
[58] Field of Search ............ 264/245, 246, 247, 328.7,
  264/328.8, 243; 425/130; 428/30, 195; 15/167 R

[56] References Cited

U.S. PATENT DOCUMENTS

| 522,791 | 7/1894 | Hubbell | 264/246 |
|---|---|---|---|
| 3,046,013 | 7/1962 | Kutik | 264/247 |
| 3,426,121 | 2/1969 | Faulkner | 264/247 |
| 3,809,733 | 5/1974 | Sandiford et al. | 264/328.7 |
| 4,073,854 | 2/1978 | Burry | 264/246 |

OTHER PUBLICATIONS

Plastics Mold Engineering Handbook, J. DuBois and W. Pribble, Van Nostrand Reinhold Co., 1978, pp. 416–420.

Primary Examiner—Jeffery Thurlow
Assistant Examiner—V. Fischbach
Attorney, Agent, or Firm—Thomas M. Freiburger

[57] ABSTRACT

A method for producing multi-colored articles using injection molding results in an elongated article having a pattern of adjacent areas formed of discrete, separately molded materials, of different colors. Articles produced by this method are sturdy, safe and visually attractive, making them especially suitable for use as handles for personal grooming brushes and similar products.

5 Claims, 4 Drawing Figures

METHOD OF MOLDING A MULTI-COLORED ARTICLE

BACKGROUND OF THE INVENTION

The present invention relates to a process for producing multiple color articles by injection molding, and more particularly to a process which combines separate, discrete bands or patterns of different colors in intertwined fashion.

Prior to the present invention, the vast majority of toothbrush handles and similar items has been made up of rather plain, one-color items occasionally decorated with paint, embossing or decals. As both dental science and modern tastes have developed, it has become increasingly clear that frequent brushing is beneficial to dental health, and that the addition of bright colors, stripes and other visually attractive elements to ordinary items such as jogging shoes, sweat shirts, dental floss, and sweat pants increases public interest in the otherwise dull but beneficial activities they support.

Attempts to create visually more attractive or interesting articles such as toothbrushes were limited in that the less expensive methods of decoration—embossing, paint, and decals—added very little visual appeal, were subject to deterioration with wear, or posed potential health problems in situations in which the article was placed in the user's mouth, as with toothbrush handles. More expensive techniques for manufacturing multicolored plastic articles suitable for use as handles were not feasible since the articles themselves have strictly limited useful lives and therefore their price must be kept low.

Injection molding techniques for producing articles with separate areas of different-color materials have been known. For example, see Danielson et al. U.S. Pat. No. 2,663,910, directed to a method for molding a multipart plastic structure. The Danielson patents shows a two-step molding procedure, but one suitable only for producing relatively simple articles such as poker chips, telephone buttons and other plastic items with indicia on the item's face. Although the method of the Danielson patent included the precasting of a preliminary molded part, that method did not include the principles of the present invention described below.

SUMMARY OF THE INVENTION

A primary object of the present invention is to produce visually attractive articles in an elongated general configuration suitable for such uses such as toothbrush handles and other cosmetic products. A related or somewhat subsidiary object is to provide a process resulting in bicolor helically striped objects, said helical stripes spiraling around the article in the manner of candy cane or barber pole stripes. Other patterns are also encompassed by the invention.

Another object of this invention is to provide a process utilizing available injection molding machines and to some extent, techniques, so that the production cost of such articles is low enough to make them available for use in products with relatively brief useful lives, such as toothbrushes. Yet another object of this invention is to provide a process with specifications such that the materials which are incorporated in the finished article are safe for use inside the mouths of users, such as toothbrush handles or similar devices. Still another object of the invention is to provide articles of sufficient durability, inter alia, to allow bristles or other parts to be permanently and safely attached to the molded article.

These and other objects can be achieved through practice of this invention. The process requires preparation of two or more generally elongated molds, one for the first molding material and additional molds for each succeeding shot of molding material. The molds are made of materials suitable for use in injection molding and shapeable into precise lines and angles so that the stripes or other patterns in the finished articles are visually crisp and precise. The finished molds are used in succession in a standard injection molding machine wherein the molding materials, for example cellulose acetate or cellulose butylate, are injected. The molding materials, in the preferred embodiment, are of separate colors.

The first material injected (also known as the "first shot") is injected into a mold which provides cavities delineating all of the stripes or pattern components of the first material (or color) and delineating an generally elongated interior spine piece. This piece is configured to give the preliminary part resulting from the first shot—the first shot piece—sufficient strength to prevent the pressure of the second shot from distorting the configuration of the pattern. The cavities for the pattern are arranged in the first shot mold to allow continuous flow of material among the cavities for that material during the first shot. Following the first shot, the first shot piece is removed from the first shot mold and placed in the second mold.

The second shot mold cavity provides the form for a pattern of greater surface area. If the second shot is the final shot, the second mold is in the shape of the entire outer surface of the article. During the second shot, the second shot material flows through and fills the gaps in the first shot piece resulting from the first shot mold. The final article has a pattern of two or more discrete and separately molded materials, side by side at the surfaces of the article and appearing somewhat better delineated than a painted-on or other surface-applied pattern.

Accordingly, in a preferred embodiment of the invention a method of manufacture of an generally elongated article with multiple discrete molding materials by injection molding comprises first preparing a separate mold for each shot of molding material, the first mold being shaped to conform to the pattern desired for the first material, the pattern being of multiple components of an elongated general configuration making up a portion of the surface area of the article. The first mold includes a cavity which forms during the first shot an interior generally elongated spine piece connecting the various first-material components of the pattern, the spine being sufficiently strong once formed to prevent the pressure of a succeeding shot from distorting the pattern. Next the first mold is inserted into an injection molding machine, and molding material is fed into the machine and heated to a point suitable for injection molding. The first shot of molding material is injected, filling the first mold cavity to form the interior spine piece as well as the pattern for the first material, as a preliminary molded part. Once formed, the preliminarily molded part is placed into a succeeding mold for a succeeding shot which fits closely over at least a part of the pattern of the preliminary part and is shaped to form additional outer surface of the molded article. Finally, the succeeding shot material is injected into the succeeding mold cavity to fill gaps in the preliminary part between the components of the pattern.

These and other objects, advantages and features of the invention will be apparent from the following description of a preferred embodiment, considered along with the accompanying drawings.

DESCRIPTION OF A PREFERRED EMBODIMENT

Figure 1:
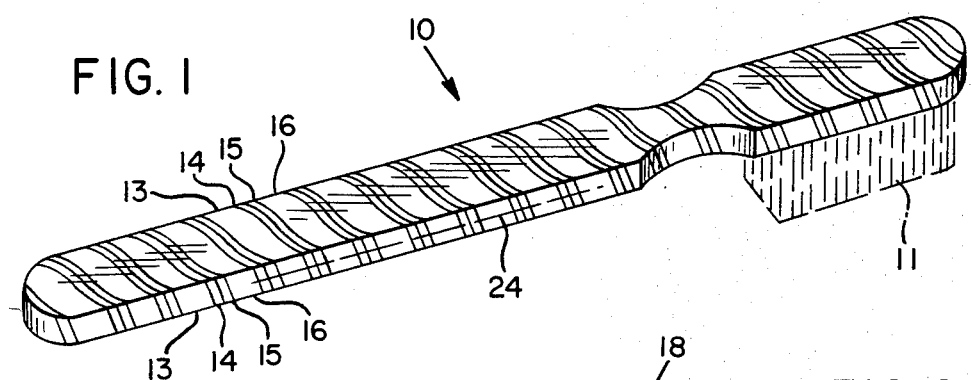
FIG. 1 is a view in perspective of a toothbrush handle formed according to the method of the invention, with toothbrush bristles indicated in broken lines.

In the drawings, FIG. 1 shows an elongated article 10 molded in accordance with the principles of the invention. The article 10 illustrated in these drawings is a toothbrush handle, with bristles 11 indicated in dashed lines, but the method of the invention can be used to produce any article wherein it is desirable to have different molding materials or different-color molding materials side by side but not intermingled, in a pattern which may be fairly intricate. There may be two or more separate molding materials used in the process of the invention. In this specification and in the appended claims the terms "separate" or "different molding materials" or "discrete molding materials" are intended to include materials which differ only in color.

In the toothbrush handle 10 of this preferred embodiment, two colors of molding material are used in an injection molding process to produce stripes 13, 14, 15, and 16 of two different colors. The wide and narrow stripes 13 and 15 may be of one color, with the narrow and wide stripes 14 and 16 being of the other color. As indicated, all of these stripes may follow a generally helical pattern around the elongated handle 10.

Figure 2:
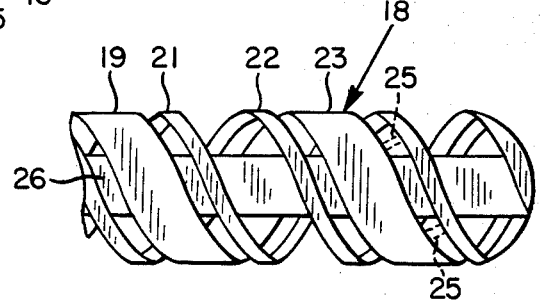
FIG. 2 is a view showing a portion of a preliminarily molded part which is a component of the article formed according to the method of the invention, the part forming one of the colors of the toothbrush handle.

By the method of the invention, a first mold (not shown) is used to form a preliminarily molded part 18, a portion of which is illustrated in FIG. 2. This part 18, formed of the first molding material, is of multiple connected components 19, 21, 22, 23, etc., forming a pattern generally of elongate configuration which makes up a portion of the surface area of the elongated article 10. A part line of this mold runs longitudinally around the periphery of the article 10, and is illustrated partially by the line 24 in FIG. 1. As illustrated, the pattern of the first molding material in the preliminary part 18 may be fairly intricate, but all components must be contiguous in a unitary, integral part. This enables communication of the injection molded material into all components of the part, and enables the single part to be easily placed in a succeeding mold as described below.

The preliminarily molded part 18 of the illustrated embodiment includes a long central spine piece 26 extending longitudinally through the part 18, spaced inwardly from the surface pattern. This adds strength to the preliminary part, for handling and to prevent damage or disfiguring of the pattern during succeeding injection molding operations, discussed below. Also, it provides an additional channel for feeding of the first injection molding material to all the components 19, 21, 22, etc., although these components already are connected and continuous through the article 10 in the helical pattern of the particular embodiment illustrated. The invention may be employed to produce other patterns not having this surface contiguity in its components.

As an additional precaution against disfiguring of the pattern of the preliminary part 18, when it includes narrow components 14 as in the particular pattern illustrated, there may be formed small bridges 25 between the thin components and the adjacent wider components. The bridges 25, shown in dashed lines in FIG. 2 in only one of the spaces, are recessed below the surface of the adjacent structure so that they will not appear in the final pattern.

Figure 3:
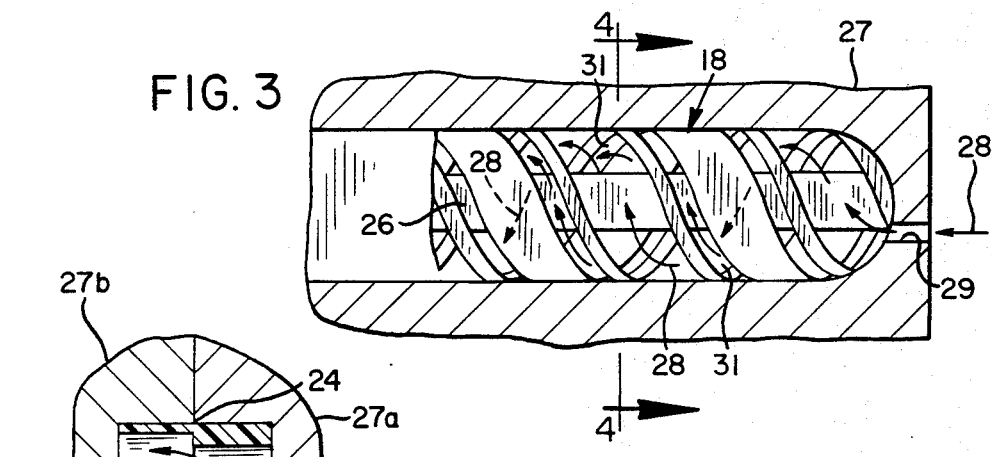
FIG. 3 is a view showing the same portion of the molded component of FIG. 2, placed in another mold where a second shot of molded material, which may be of a different color, is injected.

Once the preliminary part 18 is formed, it is placed into a succeeding mold, a portion of which is shown in section at 27 in FIG. 3. As indicated in FIG. 3, the succeeding mold 27 envelops at least a portion of the surface of the pattern formed by the first molding material in the preliminarily molded part 18. In the preferred embodiment shown here, the mold 27 envelops the entire outer surface of the preliminarily molded part, fitting closely over it, and being shaped to conform to the entire outer surface of the elongated molded article 10 as illustrated in FIG. 1. If more than two molding materials were to be used, the second mold could fit over only a portion of the outer surface of the pattern of the first part, with selected areas between the first part components 19, 21, 22, etc. blocked or filled by projecting portions of the mold so that those gaps would not be filled by the second molding material. Then, a third mold could be used which communicates a third molding material to additional areas which are gaps in the first molded part 18, and so on. The final mold of course must complete the outer surface of the entire article 10.

As FIG. 3 indicates by arrows 28, the second molding material is injected through a typical opening 29 at the end of the mold into the mold cavity to fill the gaps and spaces left in the preliminarily molded part 18. The opening 29 is located such that it communicates with a space in the preliminarily molded part which is to be filled with the second molding material.

Figure 4:
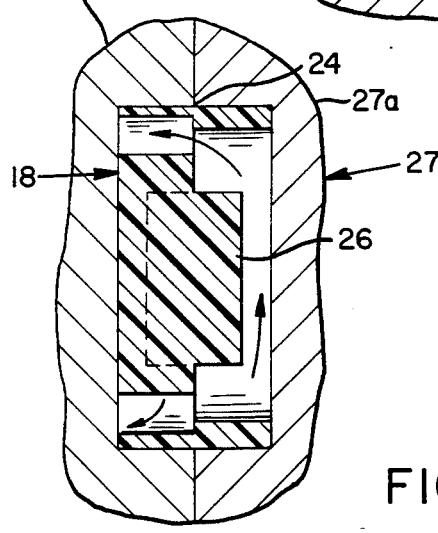
FIG. 4 is a view taken along the line 4—4 in FIG. 3, indicating the flow path of the second shot of molding material among the convolutions of the first molded part.

An important feature of this process, and of the configuration of the preliminarily molded part 18, is that there be continuity in all the space left by the preliminarily molded part 18, so that the second molding material can flow to all portions of the article which it is intended to fill. Thus, the configuration of the preliminary part 18 cannot include, for example, a series of solid transverse disks across the article 10, connected by the spine piece 26, since the second molding material would then be blocked from communicating with all the spaces to be filled. There would have to be openings in the disks to establish the flow path. In the configuration shown in these drawings, there is very adequate communication through all the spaces, and although the second molding material flows around the spaces of the preliminary part 18 in a generally helical path, there is also communication between the wider stripes of the second material and the narrower stripes, as at the location 31 indicated in FIG. 3. Here, molding material following the path of a wider stripe can migrate upwardly into a narrow stripe on the opposite side of the article. The sectional view of FIG. 4 also illustrates this migration of material. This view shows the preliminary part 18 held between the two halves 27a and 27b of the second mold 27, the parting between the molds being located at the part line 24 of the article. The interior spine piece 26 is also seen in section in this view.

For more secure mechanical bonding between the molding materials, it may be desirable in some cases to include undercuts between the components of the pattern in the preliminarily molded part 18, or geometrical shapes on the surface of the spine 26, for example, without affecting the exterior pattern (not illustrated). Such devices help lock the succeeding molding materials to the preliminary part for increased bonding integrity. Also, use of adequately high temperature in the second (and any succeeding) molding step helps form a better bond between the components. The temperature and the duration of exposure to high temperature in the second (and succeeding) mold should not be so great that the molded components flow together at the surface of the article 10.

The process of this invention results in generally elongated articles of relatively low cost but which can include two or more discrete, separately molded materials side by side at the surfaces of the article, in nearly any desired pattern. The molded articles of the invention have patterns which (unlike painted patterns) are permanent and which have a visual delineation which is different and generally sharper than painted patterns. There is no intermingling of the multiple molding materials in the pattern.

The described embodiments are not intended to be limiting, and variations to these embodiments will be apparent to those skilled in the art and may be made without departing from the spirit and scope of the invention as defined in the following claims.

I claim:

1. A method of manufacturing of an elongated article with multiple discrete molding materials of different colors by injection molding, the article have a series of juxtaposed surface color variations in a repeating pattern on all surfaces around the periphery of the article, comprising:
   a. preparing a separate mold for each separate shot of molding material, a first mold being shaped to conform to the pattern desired for the first material, the pattern being a repeating pattern of multiple components in an elongated configuration on all surfaces around the periphery of the article and making up a portion of the surface area of the elongated article, the first mold including a cavity which forms during the first shot an interior elongated, unitary contiguous spine piece connecting and integral with the various first-material components of the pattern, sufficiently strong once formed to prevent the pressure of succeeding shot from distorting the pattern, and having interstices for the succeeding shot which are contiguous from one end of the article to the other;
   b. inserting the first mold into an injection molding machine;
   c. feeding molding material into the machine and heating the material to a point suitable for injection molding;
   d. injecting the first shot of molding material from a single mold entry point in a continous flow of material among the spaces for that material and filling the first mold cavity with the first shot to form the interior spine piece as well as the pattern for the first material, as a preliminarily molded part;
   e. placing the preliminarily molded part into a succeeding mold for a succeeding shot which fits closely over at least a part of the surface pattern of the premliminary part and which is shaped to form additional outer surface of the molded article; and
   f. injecting the succeeding shot material, from a single mold entry point leading to said contiguous interstices, into the succeeding mold cavity to fill gaps in the preliminary part between components of the pattern.

2. The method of claim 1, wherein the succeeding mold is the final mold and fits over the entire surface pattern of the preliminary part to form the remaining surface of the molded article, whereby an article having discrete surface areas of separately molded material in two shots is formed.

3. The method of claim 2, wherein the first mold is shaped to form a pattern of helical stripes around the elongate article, the succeeding shot filling the gaps between the stripes to form helical stripes of another color.

4. The method of claim 1, wherein each mold has an elongated, longitudinal part line around its periphery between two mold halves.

5. An article molded in accordance with the method of any one of claims 1 to 4.

* * * * *